United States Patent
Lebrun et al.

(10) Patent No.: US 8,692,490 B2
(45) Date of Patent: Apr. 8, 2014

(54) CONTROL SYSTEM FOR A STRAIGHT SLOT DIRECT CURRENT MOTOR ACTUATOR

(75) Inventors: Jean-Louis Lebrun, Chatellerault (FR); Frédéric Sahliger, Chatellerault (FR)

(73) Assignee: Thales, Neuilly sur Seine (FR)

( * ) Notice: Subject to any disclaimer, the term of this patent is extended or adjusted under 35 U.S.C. 154(b) by 303 days.

(21) Appl. No.: 13/133,796

(22) PCT Filed: Dec. 22, 2009

(86) PCT No.: PCT/EP2009/067788
§ 371 (c)(1),
(2), (4) Date: Oct. 11, 2011

(87) PCT Pub. No.: WO2010/072782
PCT Pub. Date: Jul. 1, 2010

(65) Prior Publication Data
US 2013/0209074 A1    Aug. 15, 2013

(30) Foreign Application Priority Data
Dec. 23, 2008 (FR) ...................... 0807396

(51) Int. Cl.
*H02P 6/00* (2006.01)

(52) U.S. Cl.
USPC ............................... 318/400.01; 318/400.02

(58) Field of Classification Search
USPC ............ 318/400.01, 400.02, 400.22, 400.38, 318/400.39
See application file for complete search history.

(56) References Cited

U.S. PATENT DOCUMENTS

| | | | |
|---|---|---|---|
| 5,103,404 A * | 4/1992 | McIntosh | 318/568.22 |
| 5,637,969 A | 6/1997 | Kato et al. | |
| 6,358,263 B2 * | 3/2002 | Mark et al. | 606/167 |
| 6,918,460 B2 * | 7/2005 | Tajima et al. | 180/402 |
| 2004/0206570 A1 * | 10/2004 | Tajima et al. | 180/402 |
| 2008/0118235 A1 * | 5/2008 | Bruno | 388/816 |
| 2008/0240830 A1 * | 10/2008 | McNestry | 400/234 |

FOREIGN PATENT DOCUMENTS

| | | |
|---|---|---|
| EP | 0201605 A1 | 11/1986 |
| JP | 2004-173410 A1 | 6/2004 |

* cited by examiner

*Primary Examiner* — Rina Duda
(74) *Attorney, Agent, or Firm* — Baker Hostetler LLP

(57) ABSTRACT

A control system for an actuator including a straight slot direct current motor comprises a position sensor for measuring the angular position ($\theta$) of the motor and a current sensor for measuring the current strength (Im) in the motor, but not having a sensor for measuring the angular rotation speed of the motor.

7 Claims, 3 Drawing Sheets

CONTROL SYSTEM FOR A STRAIGHT SLOT DIRECT CURRENT MOTOR ACTUATOR

CROSS-REFERENCE TO RELATED APPLICATIONS

This application is a National Stage of International patent application PCT/EP2009/067788, filed on Dec. 22, 2009, which claims priority to foreign French patent application No. FR 08 07396, filed on Dec. 23, 2008, the disclosures of which are incorporated by reference in their entirety.

FIELD OF THE INVENTION

The present invention relates to a control system for a straight slot direct current motor actuator of the brushed or brushless type.

A well-known characteristic of a straight slot direct current motor actuator of the brushed or brushless type is that it stops virtually instantaneously if there is a power failure. This feature is extremely useful, especially in the field of aeronautics, where the reliability of an actuator is particularly important, for example in case of a failure of the associated electronic system.

BACKGROUND OF THE INVENTION

There are known control systems for straight slot direct current motor actuators, as shown in FIG. 1, which use a control system based on three feedback loops providing information on the angular position of the motor, the angular rotation speed and the current strength, the angular position and the current strength being measured by sensors. In the example of FIG. 1, the system comprises three measurement sensors, namely a sensor CP for measuring the angular position of the motor M, a sensor CV for measuring the angular rotation speed of the motor M, and a sensor CC for measuring the current strength in the motor M. These three sensors transmit their measurements along three respective feedback loops, namely a position feedback loop BRP, a speed feedback loop BRV, and a current feedback loop BRC.

The basic set point which is calculated is a set position of the motor M. The measurement θ transmitted by the position sensor CP, by means of the position feedback loop BRP, is subtracted from this set position by a first subtractor SOUS_1, and the result is transmitted to a corrector of the angular position of the motor CORRP, of a known type, which delivers at its output a set angular rotation speed for the motor. The measurement Ω, transmitted by the angular rotation speed sensor CV by means of the speed feedback loop BRV, is subtracted from this set angular rotation speed by a second subtractor SOUS_2, and the result is transmitted to a corrector of the angular rotation speed of the motor CORRV, of a known type, which delivers at its output a set motor current strength. The measurement Im, transmitted by the current sensor CC by means of the current feedback loop, is subtracted from this set motor current by a third subtractor SOUS_3, and the result is transmitted to a known motor current corrector CORRC, which delivers at its output a voltage Um which is applied to the motor M.

The cost of the sensors is high in a feedback control system of this type, notably the cost of the sensor CV for measuring the angular rotation speed Ω of the motor M.

SUMMARY OF THE INVENTION

One object of the invention is to reduce the cost of producing a feedback control system of this type.

Another object of the invention is to improve the reliability of a feedback control system of this type.

Thus, according to one aspect of the invention, a control system for a straight slot direct current motor actuator is proposed, comprising:
- a position sensor for measuring the angular position of the motor,
- a current sensor for measuring the current strength in the motor,
- a corrector of the angular position of the motor, receiving at its input the difference between a set angular position and an angular position measured by the position sensor, transmitted by a position feedback loop, and delivering at its output a set angular rotation speed for the motor,
- a corrector of the angular rotation speed of the motor, receiving at its input the difference between the set angular speed delivered by the angular position corrector and an estimated angular rotation speed of the motor, and delivering at its output a set current strength for the motor, and
- a corrector of the current strength in the motor, receiving at its input the difference between the set current strength delivered by the angular speed corrector and a current strength in the motor measured by the current sensor and transmitted by a current feedback loop, and an estimated resistive current equivalent to a resistive torque, and delivering at its output a voltage which is applied to the motor.

The system also comprises a first estimator of the angular rotation speed of the motor, which receives at its input the current strength measured in the motor and the voltage applied to the motor along a voltage feedback loop, and a second estimator of the resistive current, connected in series with the first estimator and receiving at its input the angular speed estimated by the first estimator and the measured current strength of the motor.

In this way a feedback control system for the actuator is produced at a lower cost, by dispensing with the use of an expensive sensor for measuring the angular rotation speed of the motor.

Additionally, the series arrangement of the two estimators enables all the necessary information to be obtained to use the conventional feedback control principle as illustrated, for example, in FIG. 1.

In one embodiment, the first estimator is adapted to estimate the angular rotation speed of the motor from a proportionality ratio of the back electromotive force of the motor, calculated by means of an electromotive force equation representative of the operation of the motor.

Thus a coherent estimation of the angular rotation speed of the motor is derived from accessible signals such as the measured voltage and the measured current.

For example, the first estimator comprises a first proportional integral controller, a first bandpass filter, and a first proportional calculation module.

In one embodiment, the second estimator is adapted to estimate the resistive current from the resistive torque of which it is representative, calculated by means of a mechanical equation representative of the operation of the motor.

In this way, a coherent estimate of the equivalent resistive torque is obtained.

For example, the second estimator comprises a second proportional integral controller, a second bandpass filter, and a second proportional calculation module.

An embodiment of this type can easily be implemented in FPGA systems, and offers a high robustness of the loop in relation to errors in the motor parameters.

In one embodiment, the position sensor comprises at least one Hall effect sensor.

In one embodiment the current sensor is a parallel resistance sensor, or a Hall effect sensor.

BRIEF DESCRIPTION OF THE DRAWINGS

The invention will be more clearly understood from a study of a number of embodiments provided by way of non-limiting examples and illustrated by the attached drawings, in which.

In all the drawings, elements having the same references are similar.

DETAILED DESCRIPTION

Figure 1:
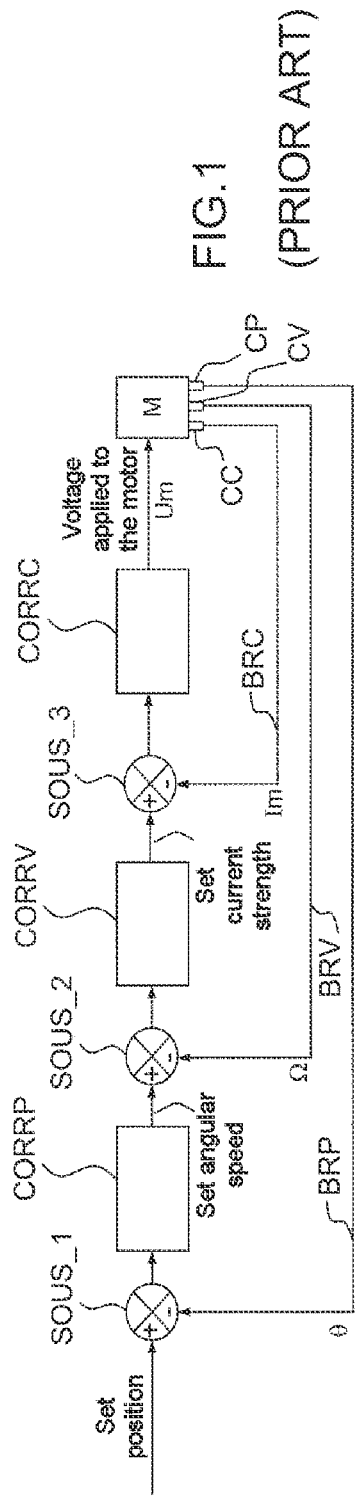
FIG. 1 shows a control system for a straight slot direct current motor actuator according to the prior art.
Figure 2:
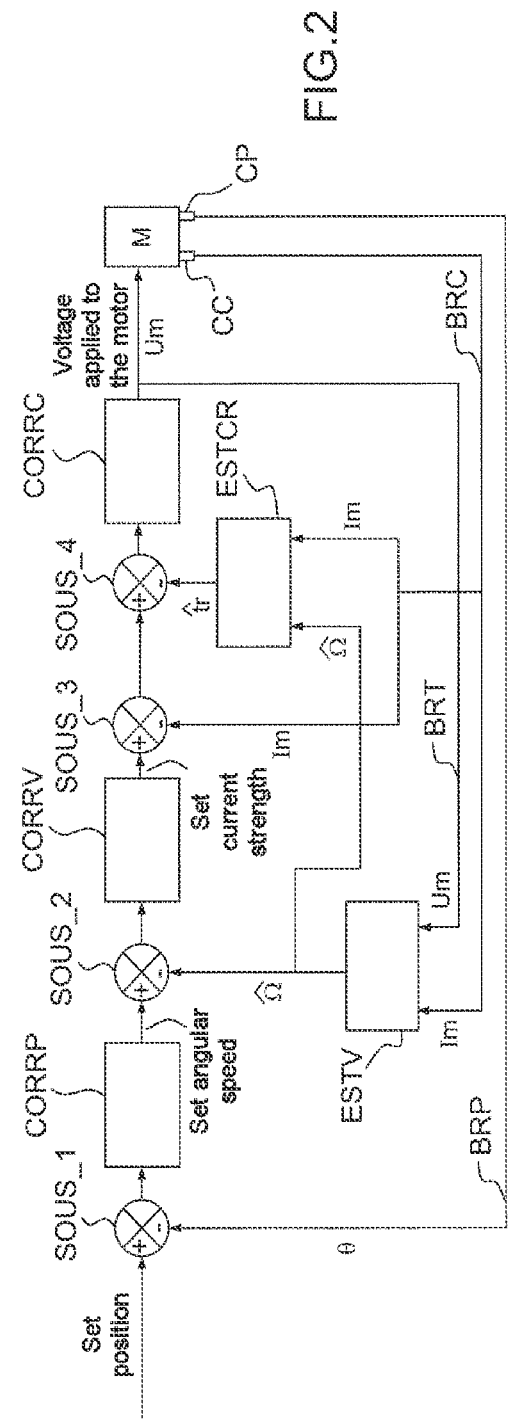
FIG. 2 shows a control system for a straight slot direct current motor actuator according to one aspect of the invention.

As shown in FIG. 2, a control system for an actuator having a straight slot direct current motor M uses a feedback control system based on three feedback loops, for the angular position θ of the motor M, for the current strength Im of the motor M, and for the voltage Um applied to the motor M, the angular position θ and the current strength Im of the motor M being measured, respectively, by a sensor CP for measuring the angular position θ of the motor M, and a sensor CC for measuring the strength Im of the current in the motor M. These two sensors transmit their measurements along three respective feedback loops, namely a position feedback loop BRP and a current feedback loop BRC.

The basic set point which is calculated is a set position of the motor M. The measurement θ transmitted by the position sensor CP, by means of the position feedback loop BRP, is subtracted from this set position by a first subtractor SOUS_1, and the result is transmitted to a corrector of the angular position of the motor CORRP, which delivers at its output a set angular rotation speed of the motor M. An angular rotation speed $\hat{\Omega}$ of the motor M, estimated by a first estimator ESTV, is subtracted from this set angular rotation speed by a second subtractor SOUS_2, and the result is transmitted to a corrector of the angular rotation speed of the motor CORRV, which delivers at its output a set current strength in the motor M. The measurement Im of the current of the motor M, transmitted by the current sensor CC by means of the current feedback loop BRC, is subtracted from this set current strength in the motor M by a third subtractor SOUS_3. Additionally, a fourth subtractor SOUS_4 subtracts a resistive current Ir equivalent to a resistive torque, estimated by a second estimator ESTCR, and the result is transmitted to a motor current corrector CORRC, which delivers at its output a voltage Um applied to the motor M.

The first estimator ESTV of the angular rotation speed $\hat{\Omega}$ of the motor M receives at its input the current strength Im measured by the current sensor CC in the motor M, together with the voltage Um applied to the motor M, via a voltage feedback loop BRT.

The second estimator ESTCR is connected in series with the first estimator ESTV, and receives at its input the angular rotation speed $\hat{\Omega}$ of the motor M estimated by the first estimator ESTV and the current strength Im measured in the motor M.

A system of this type does not have a sensor for measuring the angular rotation speed $\hat{\Omega}$ of the motor M, enabling its cost to be reduced considerably.

Figure 3:
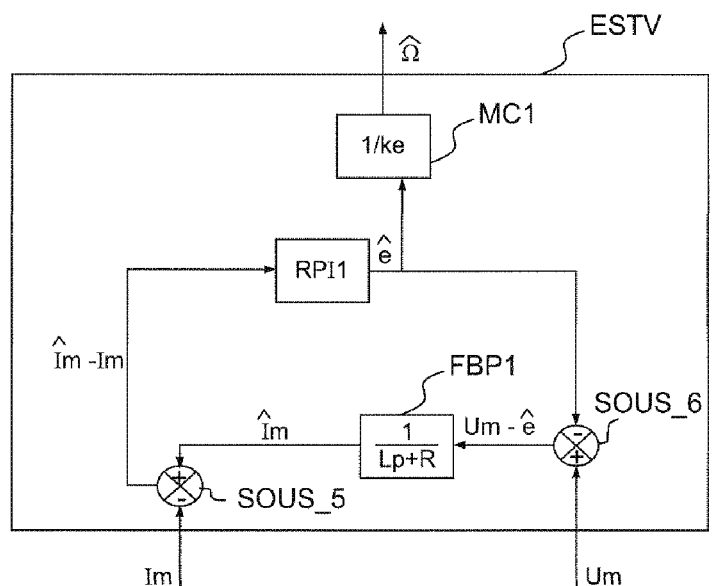
FIG. 3 shows an exemplary embodiment of the first estimator of the angular rotation speed of the motor of FIG. 2.

FIG. 3 is a schematic illustration of an exemplary embodiment of the first estimator ESTV. At its input, this estimator receives the current strength Im measured by the current sensor CC and the voltage Um applied to the motor M.

The current strength Im is subtracted, by a fifth subtractor SOUS_5, from a current strength Îm in the motor M, estimated locally and transmitted by a first bandpass filter FBP1. The difference between the estimated current strength Îm and the measured current strength Im is transmitted to a first proportional integral controller RPI1, which delivers at its output an estimated back electromotive force ê, which is sent to a first proportional calculation module MC1 and to a sixth subtractor SOUS_6 which subtracts it from the voltage Um and transmits the resulting difference Um-ê to the first bandpass filter FPB1. The first proportional calculation module calculates a proportionality ratio of the back electromotive force ê, equal to the estimated angular rotation speed $\hat{\Omega}$ of the motor M.

The angular rotation speed $\hat{\Omega}$ of the motor M is estimated by means of the electrical equation for the motor M:

$$Um = R \cdot \hat{I}m + L \cdot \dot{\hat{I}}m + \hat{e}$$

in which $$\hat{e} = Ke \cdot \hat{\Omega}$$

Um is the voltage applied to the motor M, in V,
Îm is the estimated current strength, in A,
R is the resistance of the motor M, in Ω,
L is the inductance of the motor M, in H,
ê is the estimated back electromotive force of the motor M, in V,
Ke is the coefficient of back electromotive force of the electric motor M, in V/rad/s, and $\hat{\Omega}$ is the angular rotation speed of the motor M, in rad/s.

Additionally, the operation of the first proportional integral controller RPI1 can be described by the following relation:

$$\hat{e} = PI1(p) \cdot (\hat{I}m(A) - Im(A))$$

in which $$PI1(p) = \frac{K_{I\_\hat{V}}}{p} + K_{P\_\hat{V}} = K_{I\_\hat{V}} \cdot \frac{\frac{K_{P\_\hat{V}}}{K_{I\_\hat{V}}} \cdot p + 1}{p}$$

where $K_{I\_\hat{V}}$ is the integral gain, in $V \cdot A^{-1} \cdot rad \cdot s^{-1}$, $K_{P\_\hat{V}}$ is the proportional gain, in $V \cdot A^{-1}$, and p is the Laplace variable, in $rad \cdot s^{-1}$.

The first controller RPI1 can then be designed in order to create the following system:

$$\begin{cases} \dfrac{K_{P\_\hat{V}}}{K_{I\_\hat{V}}} = \dfrac{L}{R} \\ \tau_{\hat{V}} = \dfrac{R}{K_{I\_\hat{V}}} \end{cases}$$

in which $\tau_{\hat{V}}$ is a closed loop time constant of the estimator, in seconds, in accordance with the following relation:

$$\frac{\hat{e}}{e} = \frac{1}{\tau_{\hat{V}} \cdot p + 1}$$

where e is the real back electromotive force, in V.

Additionally, the first proportional calculation module MC1 has a multiplication factor of 1/Ke, and the first bandpass filter FBP1 has a transfer function of $$\frac{1}{Lp+R}.$$

Figure 4:
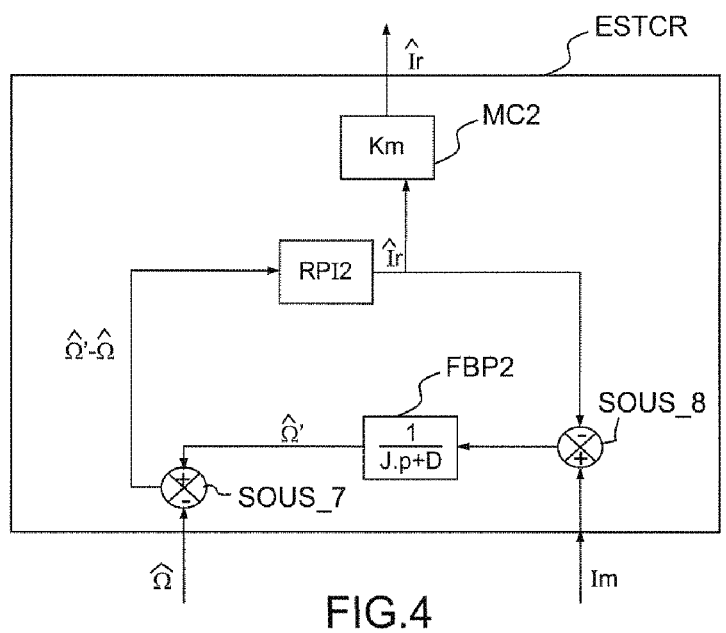
FIG. 4 shows an exemplary embodiment of the second estimator of the resistive current of the motor of FIG. 2.

FIG. 4 is a schematic illustration of an exemplary embodiment of the second estimator ESCR. At its input, this estimator receives the current strength Im measured by the current sensor CC and the estimated angular rotation speed $\hat{\Omega}$ of the motor M.

The estimated angular rotation speed $\hat{\Omega}$ of the motor M is subtracted by a seventh subtractor SOUS_7 from another angular rotation speed $\hat{\Omega}'$ of the motor M, estimated locally and transmitted by a second bandpass filter FBP2. The difference between the locally estimated angular rotation speed $\hat{\Omega}'$ of the motor M and the estimated angular rotation speed $\hat{\Omega}$ of the motor M is transmitted to a second proportional integral controller RPI2, which delivers at its output a locally estimated resistive current Î'r which is sent to a second proportional calculation module MC2, and to a seventh subtractor SOUS_7, which subtracts it from the current strength Im measured by the current sensor CC, and transmits the resulting difference Î'r–Im to the second bandpass filter FPB2. The second proportional calculation module calculates a proportionality ratio of the estimated resistive current Î'r, equal to the estimated resistive current Îr.

The resistive current Îr, which has no physical reality, is representative of the resistive torque of the motor Tr.

The estimated resistive current Îr is estimated by means of the mechanical equation for the motor:

$$Tm = J \cdot \dot{\Omega}' + D \cdot \Omega' + Tr$$

in which $$Tm = Km \cdot Im$$

$$\hat{I}r = Km \cdot \hat{I}'r,$$

Tm is the torque of the motor M, in Nm,
Tr is the resistive torque (the sum of the residual torque and the external torque), in Nm,
J is the inertia of the motor, in kg/m$^2$,
D is the viscous friction of the motor M, in Nm/rad/s, and
Km is the torque coefficient of the electric motor, in Nm/A.

The residual torque, or slot torque, is a torque of interaction between the magnets and the slots of the electric motor M, having a number of periods equal to the number of slots in one mechanical revolution. Thus the frequency of the undulations of the residual torque depends on the angular rotation speed of the motor M.

Additionally, the operation of the second proportional integral controller RPI2 can be described by the following relation:

$$\hat{I}'r = PI2(p) \cdot (\hat{\Omega}' - \hat{\Omega})$$

in which $$PI2(p) = \frac{K_{I\_\hat{T}r}}{p} + K_{P\_\hat{T}r} = K_{I\_\hat{T}r} \cdot \frac{\frac{K_{P\_\hat{T}r}}{K_{I\_\hat{T}r}} \cdot p + 1}{p}$$

where $K_{I_{\hat{T}r}}$ is the integral gain, in V·A$^{-}$·rad·s$^{-1}$, and $K_{P_{\hat{T}r}}$ is the proportional gain, in V·A$^{-1}$.

The second controller RPI2 can then be designed in order to create the following system:

$$\begin{cases} \dfrac{K_{P\_\hat{T}r}}{K_{I\_\hat{T}r}} = \dfrac{J}{D} \\ \tau_{\hat{I}r} = \dfrac{D}{Km \cdot K_{I\_\hat{T}r}} \end{cases}$$

in which $\tau_{\hat{I}r}$ is a closed loop time constant of the estimator, in seconds, in accordance with the following relation:

$$\frac{\hat{I}r}{Ir} = \frac{1}{\tau_{\hat{I}r} \cdot p + 1}$$

where Ir is the real value of the resistive current which is representative of the resistive torque.

Additionally, the second proportional calculation module MC2 has a multiplication factor of Km, and the second bandpass filter FBP2 has a transfer function of $$\frac{1}{Jp+D}.$$

The operation of the second estimator ESTCR, connected in series with the first estimator ESTV, can also be represented by the following relation:

$$\hat{I}r = \frac{1}{\tau_{Ir} \cdot p + 1} \cdot Im + \frac{D}{Km} \cdot \frac{\tau_{MECA} \cdot p + 1}{\tau_{Ir} \cdot p + 1} \hat{\Omega}$$

in which
$\tau_{MECA}$ is the mechanical time constant of the motor, in seconds, and
$\tau_{Ir}$ is the closed loop time constant of the second estimator ESTCR.

Figure 5:
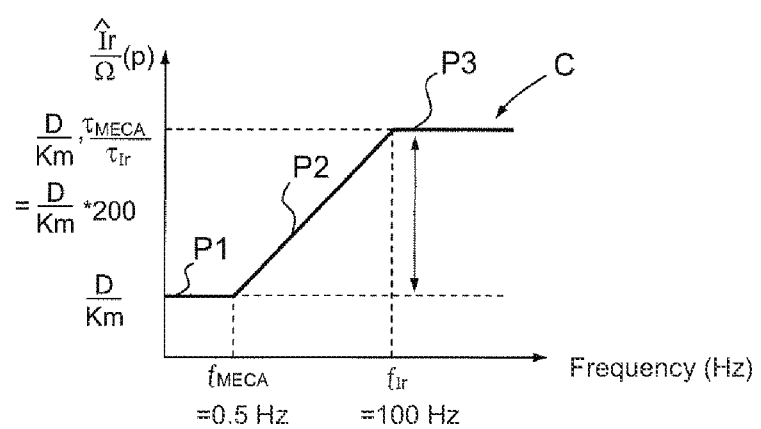
FIG. 5 shows an example of a ratio between the estimated resistive current and the estimated speed.

Thus FIG. 5 shows an example of the frequency transmission of the ratio of the estimated resistive current Îr to the estimated angular rotation speed $\hat{\Omega}$ of the motor M (curve C).

This gain curve C shows that the high frequencies (portion P3 of C) of the angular rotation speed of the motor M are amplified by a ratio of 200 compared with the low frequencies (portion P1 of C). This is due to the fact that it is desirable to have "residual torque" frequencies of up to 100 Hz (or 40 Hz without phase difference), whereas the mechanical bandwidth of the motor M is only 0.5 Hz.

If the angular rotation speed $\hat{\Omega}$ is output by a first estimator ESTV with a finite bandwidth, of about 800 Hz in this example, which therefore starts to suffer from loss of phase from several hundred hertz, the compensation of the resistive torque will be distorted by this loss of phase, and this may lead to sustained oscillation of the movement of the motor; it is preferable, therefore,

- to use the most accurate information possible on the angular rotation speed, even above 100 Hz,
- to limit the bandwidth of the closed loop of the second estimator ESTCR according to the quality of the available angular rotation speed information, and
- to provide an output filter having a steep cut-off outside the bandwidth of the loop of the second estimator ESTCR, to ensure that high-frequency oscillations caused by reinjection into a motor current loop with a high bandwidth of approximately 1000 Hz do not interfere with the movement.

The present invention enables a straight slot direct current motor actuator to be controlled at a substantially reduced cost and with greater reliability of the actuator.

The invention claimed is:

1. A control system for an actuator having a straight slot direct current motor, the system comprising:
   - a position sensor for measuring the angular position ($\theta$) of the motor,
   - a current sensor for measuring the current strength (Im) in the motor,
   - a corrector of the angular position of the motor, receiving at its input the difference between a set angular position and an angular position ($\theta$) measured by the position sensor, transmitted by a position feedback loop, and delivering at its output a set angular rotation speed of the motor,
   - a corrector of the angular rotation speed of the motor, receiving at its input the difference between the set angular speed delivered by the angular position corrector and an estimated angular rotation speed ($\hat{\Omega}$) of the motor, and delivering at its output a set current strength in the motor,
   - a corrector of the current strength in the motor, receiving at its input the difference between the set current strength delivered by the angular speed corrector and a current strength (Im) in the motor measured by the current sensor and transmitted by a current feedback loop, and an estimated resistive current ($\hat{I}r$) representative of a resistive torque, and delivering at its output a voltage (Um) which is applied to the motor,
   - a first estimator of the angular rotation speed ($\hat{\Omega}$) of the motor, which receives at its input the current strength measured in the motor and the voltage applied to the motor via a voltage feedback loop, and
   - a second estimator of the resistive current ($\hat{I}r$), connected in series with the first estimator and receiving at its input the angular rotation speed ($\hat{\Omega}$) of the motor estimated by the first estimator and the measured current strength of the motor.

2. The system according to claim 1, wherein the first estimator is configured to estimate the angular rotation speed ($\hat{\Omega}$) of the motor from a proportionality ratio of the back electromotive force of the motor, calculated by means of an electromotive force equation representative of the operation of the motor.

3. The system according to claim 2, wherein the first estimator comprises a first proportional integral controller, a first bandpass filter, and a first proportional calculation means.

4. The system according to claim 1, wherein the second estimator is adapted to estimate the resistive current ($\hat{I}r$) from the resistive torque of which it is representative, calculated by means of a mechanical equation representative of the operation of the motor.

5. The system according to claim 4, wherein the second estimator comprises a second proportional integral controller, a second bandpass filter, and a second proportional calculation means.

6. The system according to claim 1, wherein the position sensor comprises at least a Hall effect sensor.

7. The system according to claim 1, wherein the current sensor is a parallel resistance sensor or a Hall effect sensor.

* * * * *

UNITED STATES PATENT AND TRADEMARK OFFICE
CERTIFICATE OF CORRECTION

PATENT NO. : 8,692,490 B2
APPLICATION NO. : 13/133796
DATED : April 8, 2014
INVENTOR(S) : Lebrun et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 413 days.

Signed and Sealed this
Twenty-ninth Day of September, 2015

Michelle K. Lee
*Director of the United States Patent and Trademark Office*